United States Patent [19]

Hansen

[11] Patent Number: 4,695,206
[45] Date of Patent: Sep. 22, 1987

[54] PNEUMATIC CONVEYOR FOR PARTICULATE MATERIAL

[75] Inventor: Jens O. E. Hansen, Fuglebjerg, Denmark

[73] Assignee: Kongskilde Koncernselskab A/S, Sord, Denmark

[21] Appl. No.: 851,217

[22] Filed: Apr. 14, 1986

[30] Foreign Application Priority Data

Apr. 15, 1985 [DK] Denmark ............................ 1697/85

[51] Int. Cl.$^4$ ............................................ B65G 53/46
[52] U.S. Cl. ...................................... 406/65; 406/105
[58] Field of Search ............................ 406/62–68, 406/105

[56] References Cited

U.S. PATENT DOCUMENTS

| | | | |
|---|---|---|---|
| 2,301,350 | 11/1942 | Whitfield | 406/67 |
| 2,712,475 | 7/1955 | Lukes | 406/67 |
| 3,151,784 | 10/1964 | Tailor | 406/65 X |
| 3,311,420 | 3/1967 | Halstead | 406/62 |
| 3,522,972 | 8/1970 | Kemp | 406/67 |
| 4,415,296 | 11/1983 | Funk | 406/105 X |

Primary Examiner—Jeffrey V. Nase

[57] ABSTRACT

A pneumatic conveyor for particulate material of low weight per piece comprises a separator formed by a cellular rotor with a filter wall adapted to separate the particulate material as the carrying air flows to the suction side of a blower. The pressure side of said blower is in communication with a conveyor duct communicating with the separator and having a threshold forcing part of the air upwards into the rotor so as to pass the filter wall in the opposite direction, thereby blowing the filter clean before the air contributes to the further conveyance of material through the duct.

2 Claims, 1 Drawing Figure

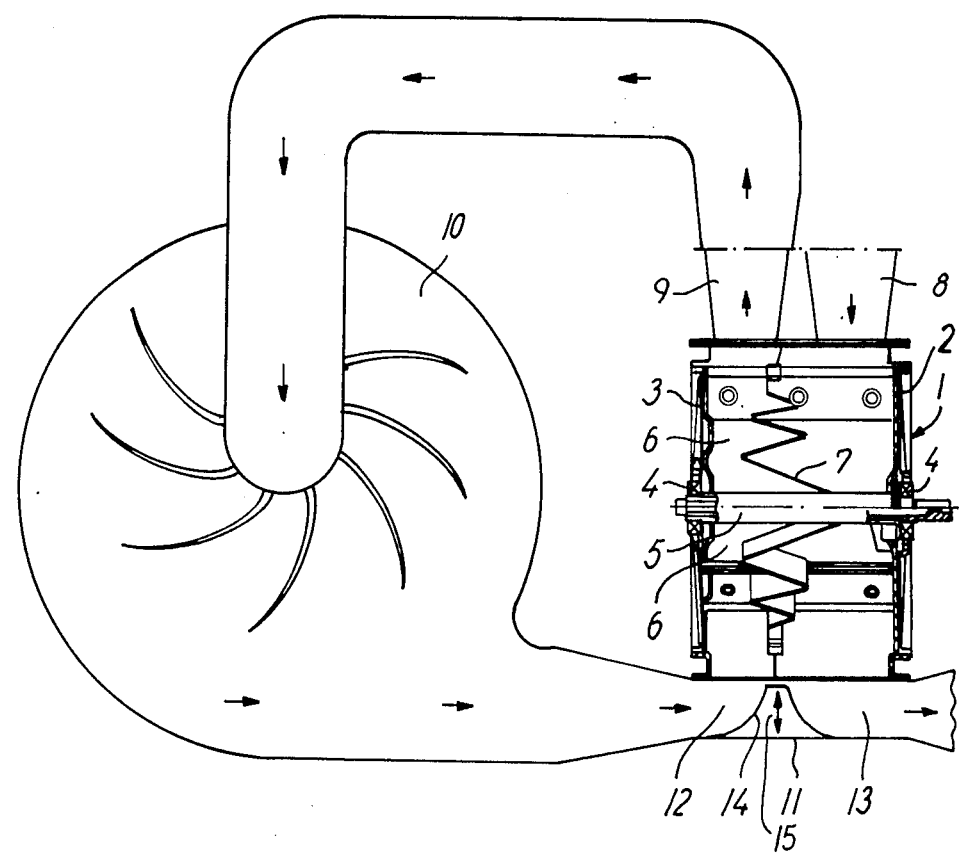

PNEUMATIC CONVEYOR FOR PARTICULATE MATERIAL

Ordinary pneumatic grain and seed conveyors comprise a cyclone separator having at its top a carrying air outlet in communication with the suction side of a blower and having at its bottom a rotary valve for discharging the grain into a pressure chamber in communication with the pressure side of the blower and extending into a grain conveying conduit. The conveyed material shall thus not pass the suction/pressure blower which therefore is not exposed to wear and may operate at enhanced efficiency.

Attempts have been made to use devices of said type for the conveyance of light materials such as paper cuttings, wood cuttings and cut straw, and thus consisting of individual flakes, but the result has not been satisfactory due to insufficient centrifugal separation between the particulate material and the carrying air.

U.S. Pat. No. 3,522,972 discloses a pneumatic conveyor for granular material in which the conveyed material is also separated from the carrying air and is reunified therewith upstream and downstream of a blower, respectively, but in this case the separation is effected by filtering. For this purpose a separator is used which comprises a cylindrical, horizontally oriented housing and a vaned rotor dividing the interior of the housing into for instance six sector-shaped cells, and the housing presenting at one end wall diametrically opposed inlet and outlet openings for air and particulate material and at its other end wall opposite openings connected with the suction side and the pressure side, respectively, of the blower. At its the end facing said latter openings the vaned rotor comprises a corotating filter disc or screen only allowing the air to pass. In a cell which is opposite said inlet opening, the conveyed material is thus detained by part of the filter, while the air from said cell flows further into the blower, and when the same cell occupies a position opposite the outlet openig the material is blown out therethrough by means of pressurized air passing the same part of the filter, but in the opposite direction. Thus, said air will also keep the filter clean, viz. by blowing away particles adhering more or less firmly to the side of the filter disc facing the cells.

On the background of said prior art this invention relates to a pneumatic conveyor for particulate material of low weight per piece, in particular flakes such as paper cuttings, cut straw, wood cuttings and saw dust, comprising a cellular rotor accommodated in a housing and having a horizontal axis and a filter wall transversal thereof, the housing including at its top and on first and second sides of said filter wall an inlet for carrying air with the particulate material and an outlet communicating with a suction blower, respectively, while the housing at its bottom and on said first and second sides of the filter wall opens to a material discharge chamber communicating with a conveyor duct and to an air inlet chamber communicating with the pressure side of the blower, respectively.

The conveyor according to the invention differs from the above explained prior art conveyor in that the discharge chamber and the air inlet chamber are axially aligned on either side of a threshold located at the plane of the filter wall and adapted to force at least part of the pressurized air from the blower upwards into the cellular rotor on said second side of the filter wall.

In this case the separation of the conveyed material from the carrying air flowing towards the blower is effected substantially in the same way as in the prior art device. However, with this device the total amount of carrying air shall again pass the filter (in the opposite direction) before it is utilized for the continued conveyance whereas, according to the invention, part of such air may pass by the filter wall, viz. may flow directly from the air inlet chamber into the discharge chamber. The height of the threshold or more specifically the distance between the top of the threshold and the periphery of the cellular rotor may determine the amount of by-passing air and thus also the amount of air that shall pass the filter wall again with a view to blow it clean. The last mentioned amount of air may thus be kept at a volume suitable for the purpose, and only as regards said amount of air a pressure loss occurs due to the flow resistance in the filter. An additional advantage of the system is that the amount of air passing by the filter wall may carry off minute particles, such as paper fluff that might have penetrated through the filter wall together with the carrying air flowing towards the blower, so that such particles are again applied to the stream of conveyed material instead of being collected on the back or second side of the filter wall.

Further, with the prior art conveyor disclosed in said patent the exploitable filter part associated with each cell is restricted to the area of the air outlet opening. Contrary thereto, the filter wall in the conveyor according to the invention can be utilized over a considerably larger area as for that purpose it may be folded or corrugated.

An embodiment of the conveyor according to the invention comprising such a folded filter wall will now be more fully explained with reference to the accompanyng drawing.

The drawing illustrates a cylindrical housing 1 with end wall 2 and 3 having bearings 4 for a horizontal shaft 5 that may be rotated at an appropriate low rate, for instance intermittently, by means of a drive motor not shown, and which is provided with radial vanes or partitions 6 extending to the periphery of the housing and constituting together with the shaft 5 the above mentioned cellular rotor. Said rotor includes between its ends a filter wall 7 the main plane of which is perpendicular to the shaft 5, but which is folded or corrugated in the circumferential direction to increase the area.

At its top the housing 1 comprises on the one side of the filter wall 7 an inlet 8 for the air carrying the particulate material, e.g. paper cuttings, and on the other side an outlet 9 communicating with the suction side of a blower 10, the pressure side of which is in connection with a conveyance conduit 11 forming an air inlet chamber 12 in open connection with the cells on the left side of the plane of the filter 7 and a discharge chamber 13 on its other side, respectively. Both chambers formed by the conduit 11 are partly separated by a threshold 14 that does not extend right up to the periphery of the cellular rotor.

In the situation illustrated on the drawing conveyed material received through the inlet 8 will be detained in the upwards open cell and more precisely in the part of the cell to the right of the filter 7, while the carrying air flows further through the filter and the outlet opening 9 into the blower 10. After a half revolution of the cellular rotor 5, 6 the cell concerned turns downwards so as to allow its contents of conveyed material to drop down into the discharge chamber 13 and be passed further by the pressurized air delivered by the blower 10 and flowing through the conduit 11. The threshold 14 in this conduit causes, however, part of the pressurized air from the chamber 12 to be blown upwards into the cell part to the left of the filter wall 7 and must therefore pass this wall, thereby causing both the filter and the chamber to the right thereof to be blown clean.

In order to control the amount of air forced to follow said path the threshold 14 may appropriately be adjustable in height as indicated by arrow 15 or backwards and forwards in the conduit 11.

What is claimed is:

1. A pneumatic conveyor for delivery of low weight particulate material comprising
    a cellular rotor including
        a cylindrical housing (1) having spaced side wall (2 and 3),
        bearing means (4) in each side wall (2 and 3),
        a horizontal shaft (5) extending between said side walls (2 and 3) and being supported by said bearing means (4),
    a plurality of radial vanes (6) carried by said shaft (5) and extending to the periphery of the housing (1), to define a plurality of radial cells,
    a filter wall (7) vertically disposed in said housing (1) transversely to said horizontal shaft and separating said housing into an inlet side and an outlet side,
    an air inlet (8) on top of said housing communicating with said inlet side for air carrying the particulate material into said inlet side,
    an air outlet (9) on top of said housing communicating with said outlet side for carrying air from said outlet side,
    a conveyance conduit (11) on the bottom of said housing (1) having at one end an air inlet chamber (12) in open communication with the outlet side of said housing (1) and at an opposite end a discharge chamber (13) in open communication with the inlet side of said housing (1) to receive particulate material therefrom,
    a blower 10 having a suction protion communicating with said air outlet (9) to withdraw air from the outlet side of said housing (1) and having a pressure portion communicating with said air inlet chamber (12) to deliver pressurized air thereto,
    a threshold means (14) located at the plane of the filter wall in said conveyance conduit (11) to narrow an air flow path therebetween whereby part of the pressurized air proceeds from said air inlet chamber (12) upward into the outlet side of said housing (1) and whereby a second part of the pressurized air proceeds directly into said discharge chamber (13) for air carrying and discharging the particulate material dropped thereinto.

2. A conveyor as claimed in claim 1 wherein the threshold is adjustable to control the amount of air to be forced upwards into the rotor.

* * * * *